United States Patent
Hutchinson et al.

(10) Patent No.: US 12,297,903 B2
(45) Date of Patent: May 13, 2025

(54) VEHICLE INITIALIZATION

(71) Applicant: JAGUAR LAND ROVER LIMITED, Coventry (GB)

(72) Inventors: Timothy Hutchinson, Coventry (GB); Sarath Nair, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/564,568

(22) PCT Filed: May 27, 2022

(86) PCT No.: PCT/EP2022/064410
§ 371 (c)(1),
(2) Date: Nov. 27, 2023

(87) PCT Pub. No.: WO2022/248666
PCT Pub. Date: Dec. 1, 2022

(65) Prior Publication Data
US 2024/0240713 A1    Jul. 18, 2024

(30) Foreign Application Priority Data

May 27, 2021  (GB) .................................. 2107548

(51) Int. Cl.
*F16H 61/16*        (2006.01)
*F16H 59/54*        (2006.01)
(Continued)

(52) U.S. Cl.
CPC ............. *F16H 61/16* (2013.01); *F16H 59/54* (2013.01); *F16H 2059/366* (2013.01);
(Continued)

(58) Field of Classification Search
CPC .... F16H 59/54; F16H 61/16; F16H 2059/366; F16H 2059/683; F16H 2061/0053; F16H 2061/161
See application file for complete search history.

(56) References Cited

U.S. PATENT DOCUMENTS 5,265,018 A      11/1993  Sokol et al.
8,626,380 B2 *    1/2014  Styles .................... B60N 2/002
                                                                      455/84

(Continued)

FOREIGN PATENT DOCUMENTS

DE          60221211 T2      4/2008
DE       102010053950 A1     8/2011
KR          100428191 B1     4/2004

OTHER PUBLICATIONS

Great Britain Intellectual Property Office, Combined Search and Examination Report under Sections 17 and 18(3) Issued in Application No. GB2107548.6, Nov. 19, 2021, 8 pages.

(Continued)

*Primary Examiner* — Edwin A Young
(74) *Attorney, Agent, or Firm* — McCoy Russell LLP (57) ABSTRACT

A control system for a vehicle includes one or more controllers, wherein the control system is configured to: receive a driver gear shift request; determine if the vehicle is in a vehicle initialisation period; determine if a driver of the vehicle is actuating at least one brake of the vehicle; store the driver gear shift request based at least in part on the determination that the vehicle is in the vehicle initialisation period and the driver is actuating at least one brake of the vehicle; determine if the vehicle initialisation period has ended; and control execution of the stored driver gear shift request when the vehicle initialisation period has ended.

16 Claims, 9 Drawing Sheets

(51) Int. Cl.
*F16H 59/36* (2006.01)
*F16H 59/68* (2006.01)
*F16H 61/00* (2006.01)

(52) U.S. Cl.
CPC ............. *F16H 2059/683* (2013.01); *F16H 2061/0053* (2013.01); *F16H 2061/161* (2013.01)

(56) References Cited

U.S. PATENT DOCUMENTS

| | | |
|---|---|---|
| 2006/0116239 A1* | 6/2006 | Kumazawa ............. F16H 61/16 477/115 |
| 2006/0211536 A1 | 9/2006 | Guggolz et al. |
| 2013/0151097 A1 | 6/2013 | Deurloo et al. |
| 2016/0137193 A1 | 5/2016 | Johri et al. |
| 2018/0058575 A1 | 3/2018 | Khan |
| 2020/0298862 A1 | 9/2020 | Tomita |

OTHER PUBLICATIONS

ISA European Patent Office, International Search Report and Written Opinion Issued in Application No. PCT/EP2022/064410, Nov. 14, 2022, WIPO, 15 pages.

* cited by examiner

VEHICLE INITIALIZATION

CROSS REFERENCE TO RELATED APPLICATIONS

The present application is a U.S. National Phase of International Application No. PCT/EP2022/064410 entitled "VEHICLE INITIALISATION," and filed on May 27, 2022. International Application No. PCT/EP2022/064410 claims priority to Great Britain Patent Application No. 2107548.6 filed on May 27, 2021. The entire contents of each of the above-listed applications are hereby incorporated by reference for all purposes.

TECHNICAL FIELD

The present disclosure relates to vehicle initialization. In particular, but not exclusively, it relates to vehicle initialization in a passenger vehicle. Aspects of the invention relate to a control system, to a method, to a vehicle, and to computer software.

BACKGROUND

When a vehicle is started, systems of the vehicle are initialized and the vehicle goes through an initialization period.

During a vehicle initialization period, one or more system of the vehicle may not be able to react as anticipated by a driver of the vehicle.

For example, during a vehicle initialization period one or more systems of the vehicle may not be able to respond to a driver input in an expected manner.

SUMMARY OF THE INVENTION

It is an aim of the present invention to address one or more of the disadvantages associated with the prior art.

According to an aspect of the invention there is provided a control system for a vehicle, the control system comprising one or more controllers, wherein the control system is configured to:
 receive a driver gear shift request;
 determine if the vehicle is in a vehicle initialisation period;
 determine if a driver of the vehicle is actuating at least one brake of the vehicle;
 store the driver gear shift request in dependence on the determination that the vehicle is in an initialisation period and the driver is actuating at least one brake of the vehicle;
 determine if the vehicle initialisation period has ended; and
 control execution of the stored driver gear shift request when the vehicle initialisation period has ended.

An advantage is more efficient initialization of a vehicle. This is because driver gearshift requests can be used, even when received during initialization, removing need for repeated driver input, for example.

An advantage is that a vehicle can respond to a driver input as expected by the driver.

In some examples, the vehicle initialisation period is a period in which non-park gears are unavailable.

In some examples, the vehicle initialisation period comprises an engine crank period, a transmission hydraulic pressure build-up period, and/or a period in which one or more safety and/or integrity checks are performed.

In some examples, determining if the vehicle initialisation period has ended comprises determining if a gear requested in the driver gear shift request is available.

In some examples, the control system is configured to:
 determine if the vehicle initialisation period ends within a predetermined time from receiving the driver gear shift request; and
 control execution of the stored driver gear shift request if it is determined that the vehicle initialisation period has ended within a predetermined time from receiving the driver gear shift request.

An advantage is that unexpected execution of a driver gearshift request can be prevented.

In some examples, the control system is configured to:
 control execution of the stored driver gear shift request if it is determined that the vehicle initialisation period has ended and the driver of the vehicle is actuating at least one brake of the vehicle.

In some examples, the driver gear shift request is a request for a non-park gear.

According to a further aspect of the invention there is provided a control system for a vehicle, the control system comprising one or more controllers, wherein the control system is configured to:
 receive a driver gear shift request;
 determine if the vehicle is in a vehicle initialisation period;
 store the driver gear shift request in dependence on the determination that the vehicle is in an initialisation period;
 determine if the vehicle initialisation period has ended; and
 control execution of the stored driver gear shift request) when the vehicle initialisation period has ended.

According to a further aspect of the invention there is provided a vehicle comprising a control system as described herein.

According to a further aspect of the invention there is provided a vehicle initialisation method, comprising:
 receiving a driver gear shift request;
 determining if the vehicle is in a vehicle initialisation period;
 determining if a driver of the vehicle is actuating at least one brake of the vehicle;
 storing the driver gear shift request in dependence on the determination that the vehicle is in an initialisation period and the driver is actuating at least one brake of the vehicle;
 determining if the vehicle initialisation period has ended; and
 controlling execution of the stored driver gear shift request when the vehicle initialisation period has ended.

In some examples, the vehicle initialisation period is a period in which non-park gears are unavailable.

In some examples, the vehicle initialisation period comprises an engine crank period, a transmission hydraulic pressure build-up period, and/or a period in which one or more safety and/or integrity checks are performed.

In some examples, determining if the vehicle initialisation period has ended comprises determining if a gear requested in the driver gear shift request is available.

In some examples, the method comprises:
 determining if the vehicle initialisation period ends within a predetermined time from receiving the driver gear shift request; and controlling execution of the stored driver gear shift request if it is determined that the vehicle initialisation period has ended within a predetermined time from receiving the driver gear shift request.

In some examples, the method comprises:

controlling execution of the stored driver gear shift request if it is determined that the vehicle initialisation period has ended and the driver of the vehicle is actuating at least one brake of the vehicle.

In some examples, the driver gear shift request is a request for a non-park gear.

According to a further aspect of the invention there is provided computer software that, when executed, is arranged to perform of at least part of any one or more of the methods described herein.

According to a further aspect of the invention there is provided a vehicle initialisation method, comprising:
  receiving a driver gear shift request;
  determining if the vehicle is in a vehicle initialisation period;
  storing the driver gear shift request in dependence on the determination that the vehicle is in an initialisation period;
  determining if the vehicle initialisation period has ended; and
  controlling execution of the stored driver gear shift request when the vehicle initialisation period has ended.

According to a further aspect of the invention there is provided a control system for a vehicle, the control system comprising one or more controllers, wherein the control system is configured to:
  receive a driver gear shift request;
  determine if the vehicle is in a vehicle initialisation period;
  determine if a driver of the vehicle is actuating at least one brake of the vehicle;
  store the driver gear shift request in dependence on the determination that the vehicle is in an initialisation period and the driver is actuating at least one brake of the vehicle;
  determine if the vehicle initialisation period has ended; and
  execute the stored driver gear shift request when the vehicle initialisation period has ended.

Aspects and embodiments of the invention provide a control system for a control system, a vehicle, a vehicle initialization method and computer software as claimed in the appended claims.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
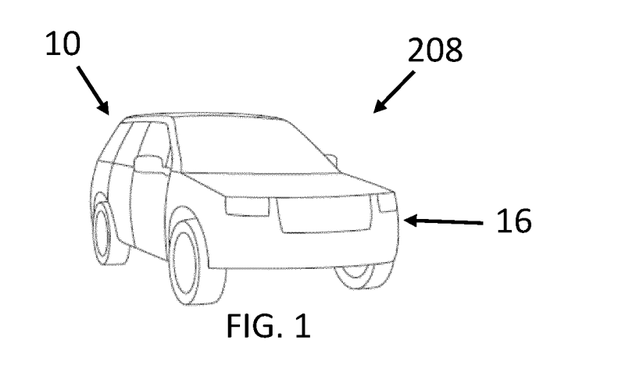
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle 10, also referred to as a passenger car or as an automobile. In other examples, embodiments of the invention can be implemented for other applications, such as commercial vehicles 10.

The vehicle 10 can be any suitable type of vehicle for example a hybrid electric vehicle (HEV) such as a plug-in hybrid electric vehicle (PHEV), an electric vehicle (EV) and/or a vehicle comprising an internal combustion engine (ICE).

The vehicle 10 comprises a plurality of systems including a control system 208 and one or more human machine interface(s).

The human machine interface(s) of the vehicle 10 comprise one or more controls usable by a driver of the vehicle 10, including one or more brakes 16.

The control system 208 is configured to implement any one or more of the methods described herein.

Consequently, FIG. 1 illustrates a vehicle 10 comprising a control system 208 as described herein.

Figure 2A:
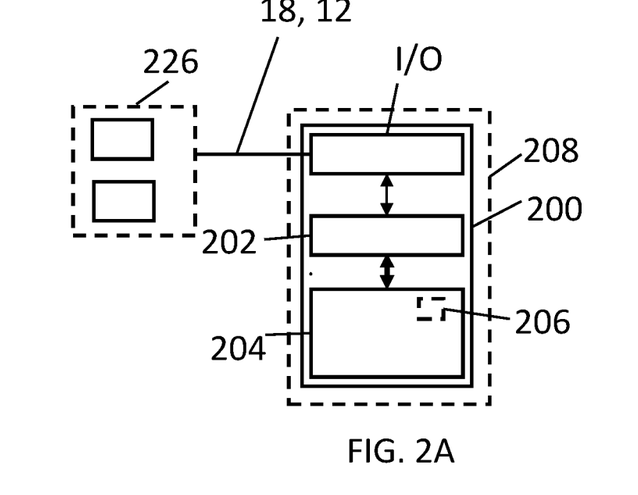
FIGS. 2A, 2B illustrate an example of a control system and of a non-transitory computer-readable storage medium.

FIG. 2A illustrates how the control system 208 may be implemented. The control system 208 of FIG. 2A illustrates a controller 200. In other examples, the control system 208 may comprise a plurality of controllers 200 on-board and/or off-board the vehicle 10.

In examples any suitable control system 208 can be used.

The controller 200 of FIG. 2A includes at least one processor 202; and at least one memory device 204 electrically coupled to the electronic processor 202 and having instructions 206 (e.g., a computer program) stored therein, the at least one memory device 204 and the instructions 206 configured to, with the at least one processor 202, cause any one or more of the methods described herein to be performed.

FIG. 2A therefore illustrates a control system 208, wherein the one or more electronic controllers 200 collectively comprise:
  at least one electronic processor 202 having an electrical input for receiving information associated with vehicle initialisation; and
  at least one electronic memory device 204 electrically coupled to the at least one electronic processor 202 and having instructions 206 stored therein;
  and wherein the at least one electronic processor 202 is configured to access the at least one memory device 204 and execute the instructions thereon so as to cause the control system 208 to perform and/or cause performance of any one or more of the methods described herein.

Also illustrated in FIG. 2A are one or more vehicle systems 226.

In examples, the vehicle system(s) 226 can comprise any suitable vehicle system(s).

For example, the vehicle system(s) can comprise any suitable vehicle system(s) 226 from which the control system 208 can receive, directly or indirectly, one or more signals 18 and/or to which the control system 208 can transmit, directly or indirectly, one or more signals 18.

In the example of FIG. 2A, the one or more vehicle systems 226 comprise one or more systems involved in vehicle initialisation. The one or more vehicle systems 226 also comprise one more human machine interfaces or controls. In the illustrated example, the one or more human machine interfaces comprise one or more brakes 16 and one or more controls that the driver of the vehicle can use to make a gearshift request 12, such as one or more gear shifters.

Figure 2B:
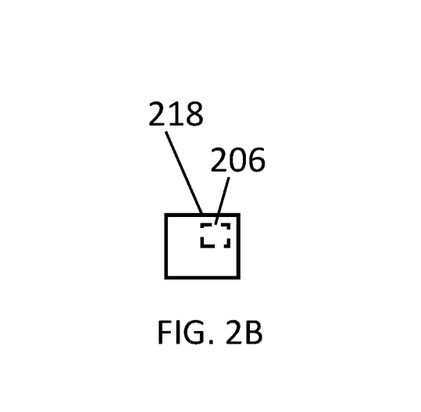

FIG. 2B illustrates a non-transitory computer-readable storage medium 218 comprising the instructions 206 (computer software).

Accordingly, FIG. 2B illustrates a non-transitory computer readable medium 218 comprising computer readable instructions 206 that, when executed by a processor 202, cause performance of at least the method of one or more of FIGS. 3, 4, 5, 6, and/or 7 and/or as described herein.

Figure 3:
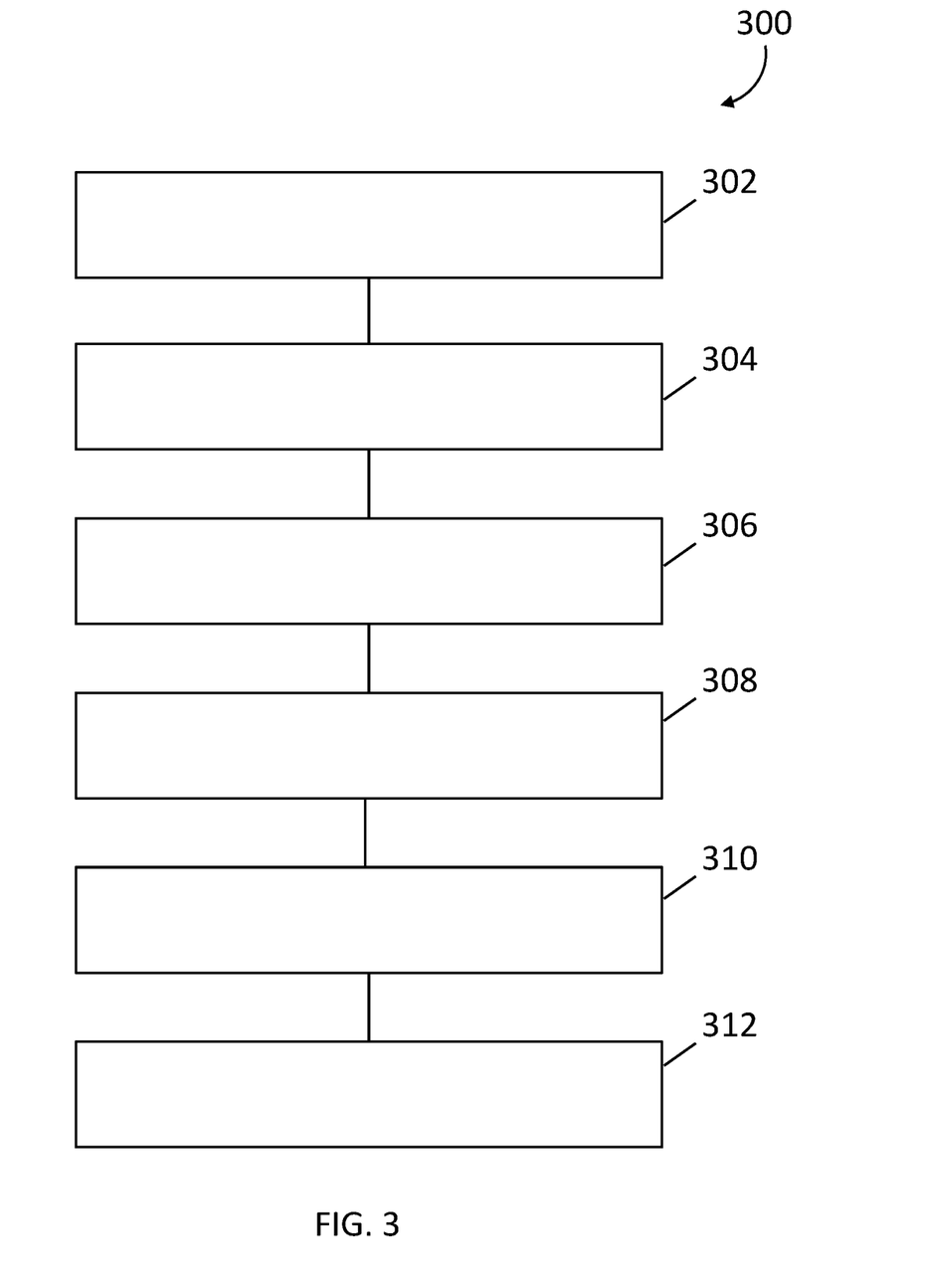
FIG. 3 illustrates an example of a method.

FIG. 3 illustrates an example of a method 300. The method 300 can be considered a vehicle initialisation method 300.

In examples, the method 300 is performed by the control system 208 of FIGS. 2A, 2B.

That is, in examples, the control system 208 described herein comprises and/or provides means for performing the method 300. However, any suitable means may be used to perform the method 300.

In examples, the method 300 can be considered a computer-implemented method 300 for a vehicle 10.

One or more of the features discussed in relation to FIG. 3 can be found in one or more of the other figures.

At block 302 the method 300 comprises receiving a driver gearshift request 12.

In examples, the driver gearshift request 12 can have any suitable form and can be received in any suitable way.

In examples, a driver gearshift request 12 results from a driver of the vehicle 10 actuating a vehicle control. See, for example, FIG. 2A.

In examples a driver gearshift request 12 can be considered a request to change the current gear and/or operating mode of the vehicle 10 to a different gear and/or operating mode.

Accordingly, as used herein, driver gearshift request 12 is intended to include any driver-initiated gear and/or operating mode change request. For example, a driver gearshift request 12 includes a driver-initiated automatic transition gear/mode change between park, neutral, drive, reverse and/or sport.

In examples, a driver gearshift request 12 can be considered a request to cause the vehicle 10 to enter a travelable state from a non-travelable state, such as a parked state.

In examples, the driver gearshift request 12 is a request for a non-park gear.

In some examples, receiving a driver gear shift request 12 comprises receiving one or more signals 18 from one or more vehicle systems 226.

At block 304, the method 300 comprises determining if the vehicle 10 is in a vehicle initialisation period 14.

In examples, a vehicle initialisation period 14 can be considered a vehicle start-up period.

In examples, determining if the vehicle 10 is in a vehicle initialisation period 14 can comprise any suitable method performed in any suitable way.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In the illustrated example, determining if the vehicle 10 is in a vehicle initialisation period 14 comprises receiving one or more signals 18 from one or more vehicle systems 226, the one or more signals 18 comprising information regarding the status of one or more vehicle systems. See, for example, FIG. 2A.

A vehicle initialisation period 14 can be started in any suitable way. In the illustrated example, the vehicle initialisation period 14 is started by an input from a driver of the vehicle, for example actuation of a start button or similar.

In examples, the vehicle initialisation period 14 can have any suitable duration and can end upon fulfilment of any suitable criterion or criteria.

In examples, the vehicle initialisation period 14 is a period in which non-park gears are unavailable and/or unavailable to engage. In examples, a period in which non-park gears are unavailable can be considered a period in which non-park gears are unavailable to engage and/or unavailable to be engaged.

In some examples, the vehicle initialisation period 14 comprises an engine crank period, a transmission hydraulic pressure build-up period, and/or period in which one or more safety and/or integrity checks are performed.

For example, the vehicle initialisation period 14 can comprise a period in which transmission hydraulic pressure builds up to allow or enable a gear shift to be made.

For example, the vehicle initialisation period 14 can comprise a period in which one or more engines are cranked prior to allowing or enabling a gear shift to be made.

For example, the vehicle initialisation period 14 can comprise a period in which one or more safety checks and/or integrity checks are made prior to allowing or enabling a gear shift to be made.

In some examples, the vehicle initialisation period 14 can be considered a period in which a driver gearshift request 12 can be received but cannot be acted upon.

Accordingly, it is possible that one or more vehicle systems 226 can be and/or can be considered to be initialising when the vehicle initialisation period 14 as used herein has ended. For example, it is possible that one or more vehicle systems 226 are still initialising when non-park gears become available and/or when non-park gears become available to engage and/or when non-park gears become available to be engaged and/or when the vehicle has entered a travelable state from a non-travelable state, such as a parked state.

At block 306, the method 300 comprises determining if a driver of the vehicle 10 is actuating at least one brake 16 of the vehicle 10.

In examples, determining if a driver of the vehicle 10 is actuating at least one brake 16 of the vehicle 10 can be performed in any suitable way using any suitable method.

For example, one or more signals 18 can be received by the control system 208 from one or more vehicle systems 226 indicating that a driver of the vehicle 10 is actuating at least one brake 16 of the vehicle 10.

In some examples, one or more autonomous or semi-autonomous systems can be used to hold the vehicle 10 stationary. Accordingly, in examples, block 306, method 300 can comprise determining if a brake 16 of the vehicle 10 is being actuated by a driver and/or by one or more autonomous or semi-autonomous systems.

At block 308, the method 300 comprises storing the driver gearshift request 12 in dependence upon the determination that the vehicle 10 is in an initialisation period 14 and the driver is actuating at least one brake 16 of the vehicle 10.

In some examples, block 308 comprises storing the driver gearshift request 12 if it is determined that the vehicle 10 is in an initialisation period 14 and the driver is actuating at least one brake 16 of the vehicle 10.

Accordingly, in examples, block 308 can be considered to comprise storing the driver gearshift request 12 if it is determined that the driver's gearshift request 12 cannot be acted upon yet and that the driver is actuating at least one brake 16 of the vehicle 10.

Additionally, or alternatively, in examples, block 308 can be considered to comprise storing the driver gearshift request 12 if the vehicle has not yet completed the vehicle initialisation period 14 and the driver is actuating at least one brake 16 of the vehicle 10.

In examples, the driver gearshift request 12 can be stored in any suitable way using any suitable method.

For example, storing the driver gearshift request 12 can comprise storing information indicating the requested gear/operating mode change in memory, such as memory 204.

In examples, storing the driver gearshift request 12 can be considered latching the driver gearshift request 12.

In some examples, storing the driver gearshift request 12 can be considered storing information configured to allow execution of the driver's gearshift request 12 when it is possible for the driver gear shift request 12 to be executed.

At block 310, the method 300 comprises determining if the vehicle initialisation period 14 has ended.

In examples, determining if the vehicle initialisation period 14 has ended can be performed in any suitable way using any suitable method.

In examples, determining if the vehicle initialisation period 14 has ended comprises receiving one or more signals 18 from one or more vehicle systems 226. See, for example, FIG. 2A.

In examples, determining if the vehicle initialisation period 14 has ended comprises determining if one or more non-park gears are available and/or available to engage. In some examples, determining if the vehicle initialisation period 14 has ended comprises determining if one or more non-park gears are available to engage and/or available to be engaged.

In some examples, determining if the vehicle initialisation period 14 has ended comprises determining if an engine crank period, a transmission hydraulic pressure build-up period and/or a period in which one or more safety/integrity checks are performed has ended.

For example, determining if the vehicle initialisation period 14 has ended can comprise determining if an engine speed is greater than a value or limit. In some examples the value or limit can be considered a predetermined value or limit.

For example, determining if the vehicle initialisation period 14 has ended can comprise determining if transmission oil pressure is greater than a value or limit. In examples, the value or limit can be considered a predetermined value or limit.

For example, determining if the vehicle initialisation period 14 has ended can comprise determining that one or more safety/integrity checks have been successfully completed.

In examples, determining if the vehicle initialisation period 14 has ended comprises determining if a gear requested in the driver gearshift request 12 is available and/or available to engage. In some examples, determining if the vehicle initialisation period 14 has ended comprises determining if a gear requested in the driver gearshift request 12 is available to engage and/or is available to be engaged.

Accordingly, in examples, determining if the vehicle initialisation period 14 has ended comprises determining if the driver gearshift request 12 received at block 302 can be acted upon.

At block 312, the method 300 comprises controlling execution of the stored driver gearshift request 12 when the vehicle initialisation period 14 has ended.

Consequently, FIG. 3 illustrates a vehicle initialisation method 300 comprising:
receiving a driver gearshift request 12;
determining if the vehicle 10 is in a vehicle initialisation period 14;
determining if a driver of the vehicle 10 is actuating at least one brake 16 of the vehicle 10;
storing the drive gearshift request 12 in dependence on the determination that the vehicle 10 is in an initialisation period 14 and the driver is actuating at least one brake 16 of the vehicle 10;
determining if a vehicle initialisation period 14 has ended; and
controlling execution of a stored driver gearshift request 12 when the vehicle initialisation period 14 has ended.

In examples, controlling execution of the stored driver gearshift request 12 when the vehicle initialisation period 14 has ended can be performed in any suitable way using any suitable method.

In examples, controlling execution of the stored driver gearshift request 12 comprises causing transmission/transmitting one or more signals 18 from the control system 208 to one or more vehicle systems 226.

In some examples, controlling execution of the stored driver gearshift request 12 comprises accessing memory 204 and causing transmission/transmitting one or more signals 18 in dependence upon the stored information.

In some examples, controlling execution of the stored driver gearshift request 12 can be considered controlling one or more vehicle systems 226 as if the driver's input that caused the drive gearshift request 12 has been made at the point in which the vehicle initialisation period 14 has ended.

In examples, block 312 can be considered to illustrate executing the stored driver gear shift request 12 when the vehicle initialisation period 14 has ended.

In examples, the method 300 comprises determining if the vehicle initialisation period 14 ends within a predetermined time from receiving the driver gearshift request 12 and controlling execution of the stored driver gearshift request 12 if it is determined that the vehicle initialisation period 14 has ended within a predetermined time from receiving the driver gearshift request 12. See, for example, FIGS. 6 and 7.

Accordingly, in examples, if the vehicle initialisation period 14 ends after expiry of a predetermined time from receipt of the driver gearshift request 12, the driver gearshift request 12 is discarded and no change in gear/state of the vehicle 10 will be executed upon the vehicle initialisation period 14 ending.

Any suitable duration of timer can be used, for example a time in the range 3 seconds to 0.5 second. For example, a timer of 1 second duration can be used.

In some examples, the method 300 comprises controlling execution of the stored driver gearshift request 12 if is determined that the vehicle initialisation period 14 has ended and the driver of the vehicle 10 is actuating at least one brake 16 of the vehicle 10. See, for example, FIGS. 4 and 5.

Accordingly, in some examples, the stored driver gearshift request 12 will not be executed at the end of the vehicle initialisation period 14 if it is determined that the driver is not actuating at least one brake 16 of the vehicle 10.

In some examples, one or more of the blocks illustrated in the example of FIG. 3 can be omitted. For example, block 306 can be omitted and block 308 changed to comprise storing the driver gearshift request 12 in dependence on the determination that the vehicle 10 is in an initialisation period 14.

Consequently, in examples, the method 300 comprises a vehicle initialisation method 300, comprising:
receiving a driver gearshift request 12,
determining if the vehicle 10 is in a vehicle initialisation period 14;
storing the driver gearshift request 12 in dependence on the determination that the vehicle 10 is in an initialisation period 14;
determining if the vehicle initialisation period 14 has ended; and
controlling execution of the stored driver gearshift request 12 when the vehicle initialisation period 14 has ended.

A technical effect of the method 300 is that an input from a driver of the vehicle 10 will be acted upon as expected by the driver instead of, for example, being ignored. This provides for a vehicle to behave in a more predictable manner from the point of view of the driver.

Another technical effect of the method 300 is that repeated inputs from a driver can be avoided providing a more efficient vehicle initialisation method.

Another technical effect of the method 300 is that the use of a timer can prevent a gearshift request 12 from being executed unexpectedly from a driver's point of view.

Figure 4:
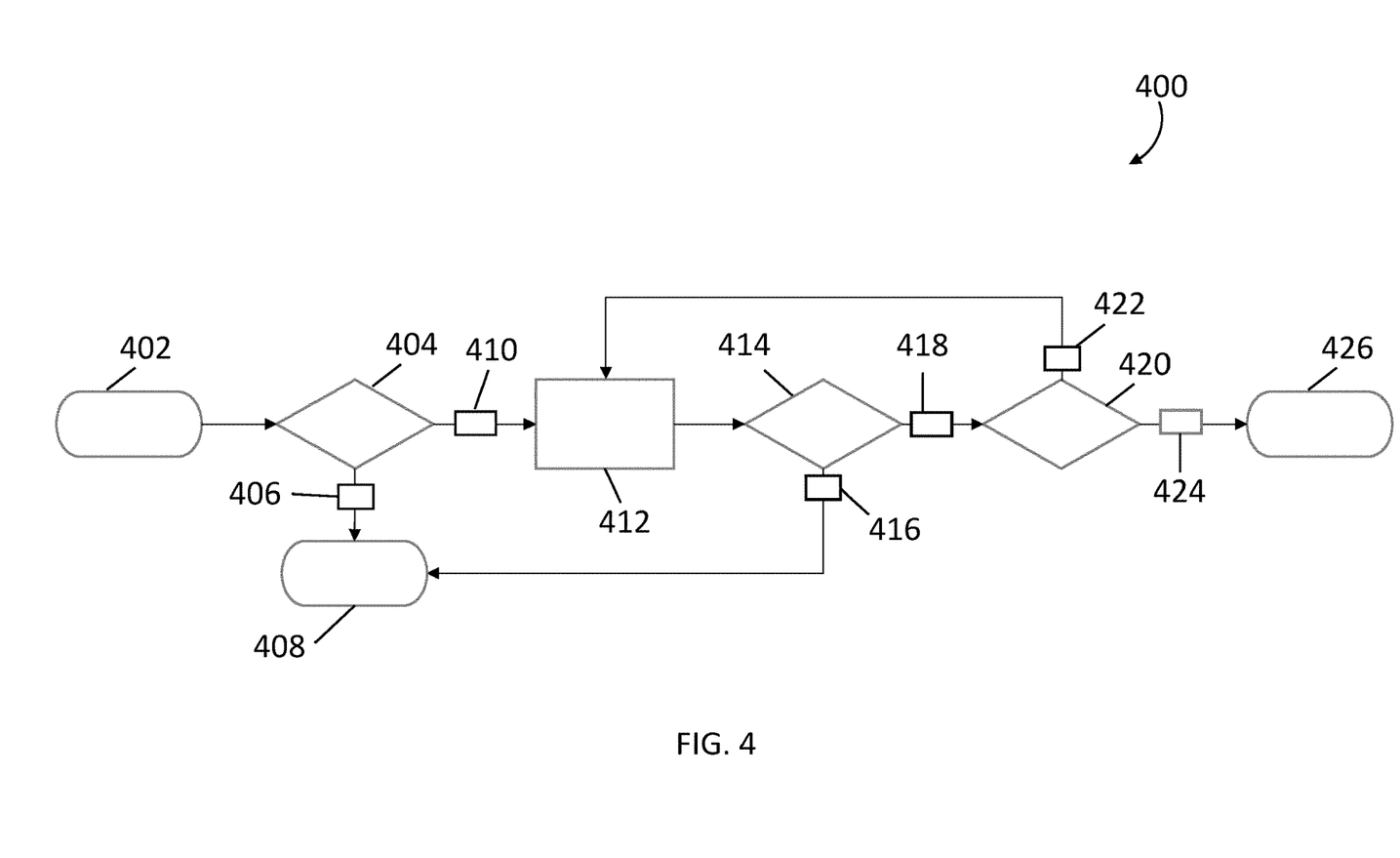
FIG. 4 illustrates an example of a method.

FIG. 4 illustrates an example of a method 400. The method 400 can be considered a vehicle initialisation method 400.

In examples, the method 400 is performed, at least in part, by the control system 208 of FIGS. 2A, 2B.

However, any suitable means can be used to perform the method 400.

At block 402, a driver of the vehicle 10 shifts from park to drive. Accordingly, a driver gearshift request 12 is received.

At block 404 it is determined if a brake 16 of the vehicle 10 is pressed.

If it is determined that a brake 16 is not pressed, the method proceeds via block 406 to block 408 where the driver shift request 12 is ignored.

However, if it is determined at block 404 that a brake 16 of the vehicle 10 is pressed, the method follows block 410 to block 412.

At block 412 the driver gearshift request 12 is stored and the method 400 proceeds to block 414 where it is determined if a brake 16 of the vehicle 10 is pressed.

If it is determined that no brake 16 of the vehicle 10 is pressed the method proceeds via block 416 to block 408 where the driver gearshift request 12 is ignored.

However, if at block 414 it is determined that a brake 16 of the vehicle 10 is pressed the method 400 proceeds via block 418 to block 420. At block 420 it is determined if drive is available and/or available to engage.

If it is determined that drive is not available and/or available to engage the method 400 proceeds via block 422 back to block 412. However, if it is determined at block 420 that drive is available and/or available to engage the method proceeds via block 424 to block 426. At block 426 drive is engaged.

Figure 5:
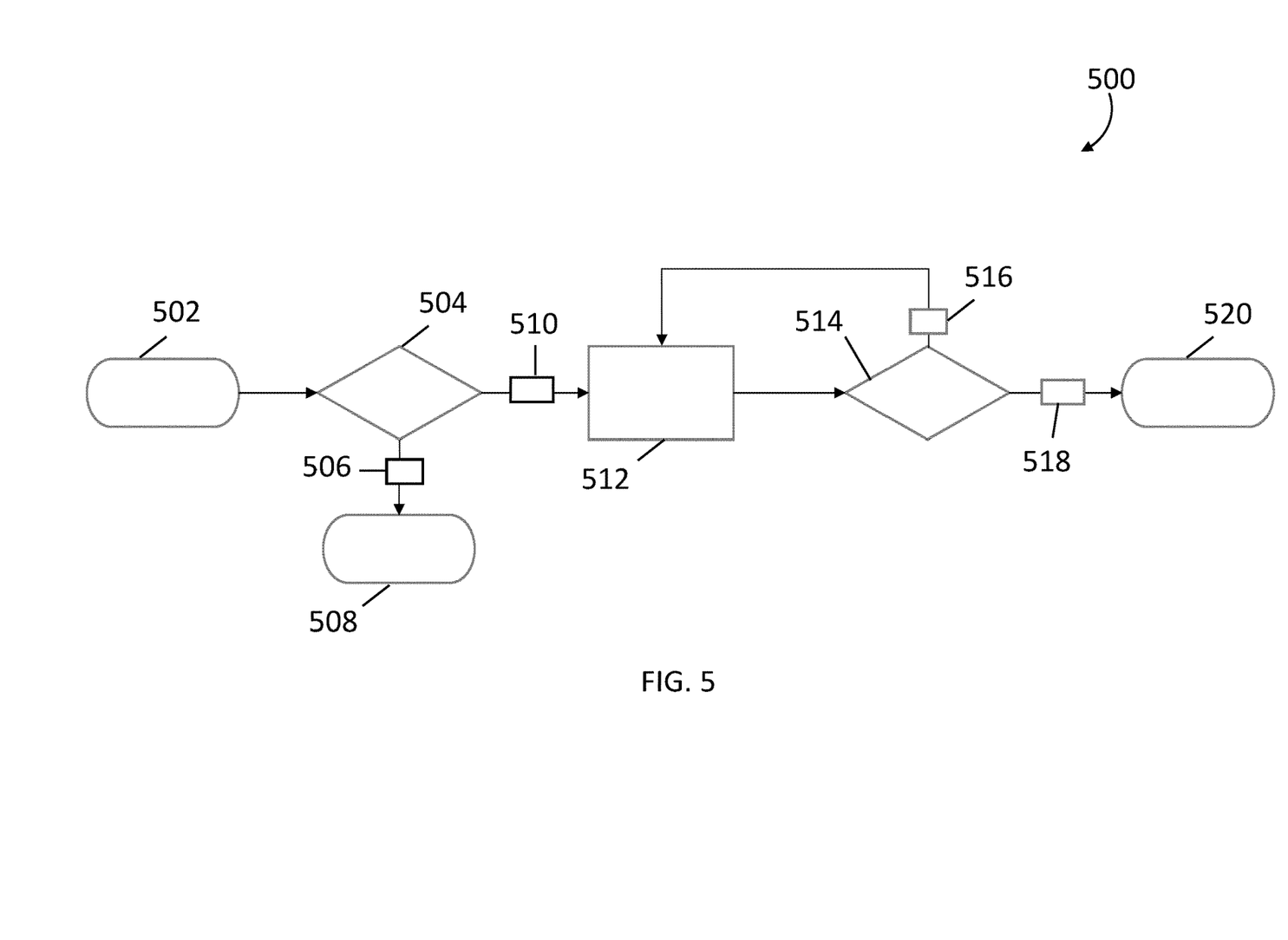
FIG. 5 illustrates an example of a method.

FIG. 5 illustrates an example of a method 500. The method 500 can be considered a vehicle initialisation method 500.

In examples, the method 500 is performed, at least in part, by the control system 208 of FIGS. 2A, 2B.

At block 502, a driver shifts from park to drive and a driver gearshift request 12 is received.

The method proceeds to block 504 where it is determined if the driver is pressing a brake 16 of the vehicle 10.

If it is determined, at block 504, that the driver is not pressing a brake 16 of the vehicle 10 the method 500 proceeds via block 506 to block 508 and the driver shift request 12 is ignored.

However, if it is determined at block 504 that the driver is pressing a brake 16 of the vehicle, the method 500 proceeds via block 510 to block 512.

At block 512, the gearshift request 12 is stored and the method proceeds to block 514 and it is determined if drive is available and/or available to engage.

If it is determined that drive is not available and/or available to engage, the method 500 proceeds via block 516 to block 512. However, if it is determined, at block 514, that drive is available and/or available to engage, the method proceeds via block 518 to block 520. At block 520, drive is engaged.

Figure 6:
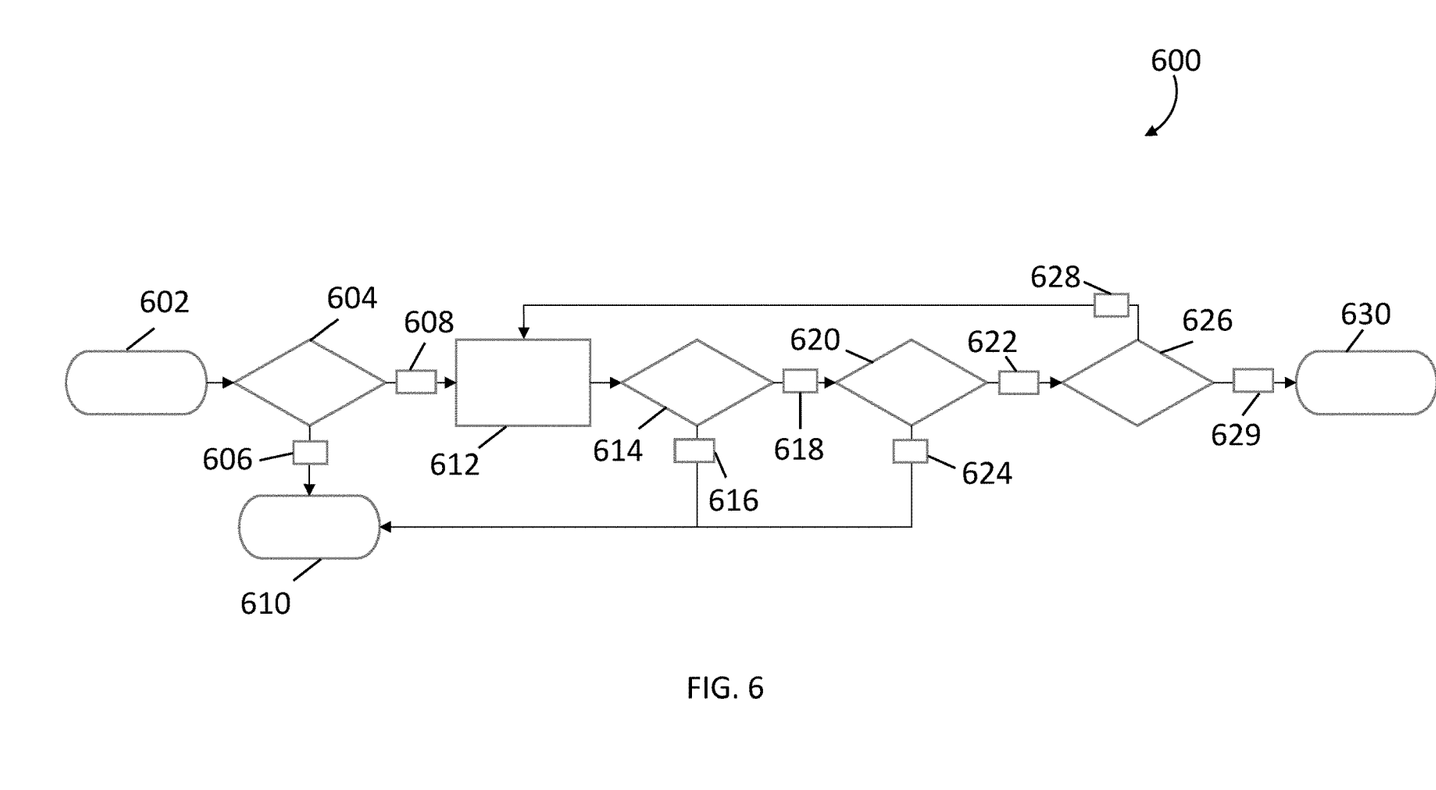
FIG. 6 illustrates an example of a method.

FIG. 6 illustrates an example of a method 600. The method 600 can be considered a vehicle initialisation method 600.

In examples, the method 600 is performed, at least in part, by the control system 208 of FIGS. 2A, 2B.

At block 602 a driver of a vehicle 10 shifts from park to drive and a driver gearshift request 12 is received.

The method 600 proceeds to block 604 where it is determined if the driver is pressing a brake 16 of the vehicle 10.

If it is determined, at block 604, that the driver is not pressing a brake 16 of the vehicle 10, the method 600 proceeds via block 606 to block 610 and the driver shift request 12 is ignored. However, if it is determined at block 604 that the driver is pressing a brake 16 of the vehicle 10, the method 600 proceeds via block 608 to block 612.

At block 612, the driver gearshift request 12 is stored and the method 600 proceeds to block 614.

At block 614, it is determined if a timer has elapsed since the driver gearshift request 12 was received. If it is determined, at block 614, that the timer has elapsed, the method 600 proceeds via block 616 to block 610 and the driver gearshift request 12 is ignored.

If, however, it is determined at block 614 that the timer has not elapsed, the method 600 proceeds via block 618 to block 620. At block 620, it is determined if a driver of the vehicle is pressing a brake 16 of the vehicle 10.

If it is determined at block 620 that a driver of the vehicle 10 is not pressing a brake 16 of the vehicle 10 the method 600 proceeds via block 624 to block 610 and the driver gearshift request 12 is ignored.

However, if it is determined at block 620 that a driver of the vehicle 10 is pressing a brake 16 of the vehicle 10 the method 600 proceeds via block 622 to block 626. At block 626, it is determined if drive is available and/or available to engage.

If it is determined that drive is not available and/or available to engage, the method 600 proceeds via block 628 back to block 612. However, if it is determined, at block 626, that drive is available and/or available to engage, the method 600 proceeds via block 629 to block 630 where drive is engaged.

Figure 7:
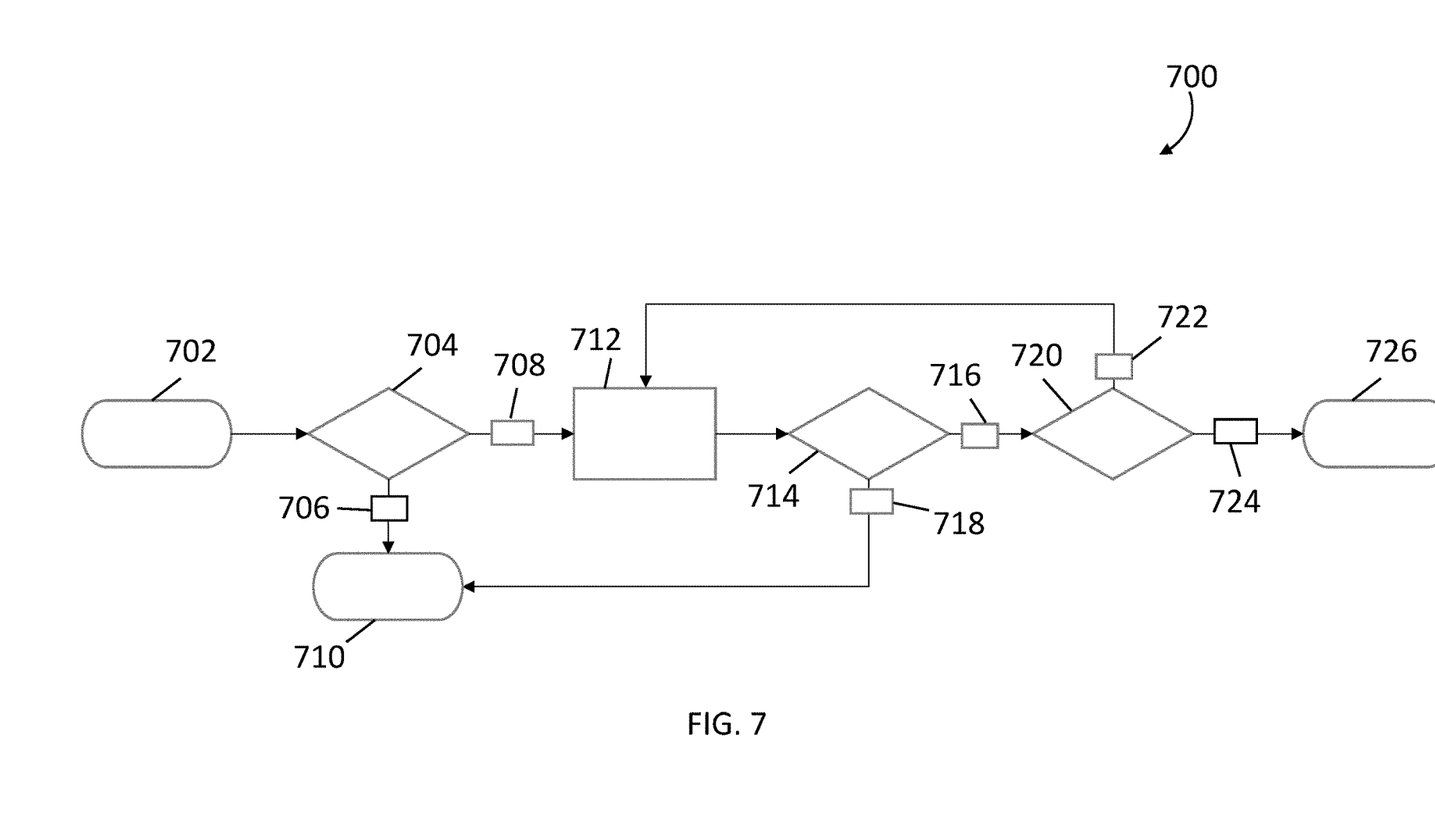
FIG. 7 illustrates an example of a method.

FIG. 7 illustrates an example of a method 700. The method 700 can be considered a vehicle initialisation method 700.

In examples, the method 700 is performed, at least in part, by the control system 208 of FIGS. 2A, 2B.

At block 702, a driver shifts from park to drive and a driver gearshift request 12 is received.

The method 700 proceeds to block 704 where it is determined if a driver of the vehicle 10 is pressing a brake 16 of the vehicle 10.

If it is determined, at block 704, that a driver of the vehicle 10 is not pressing a brake 16 of the vehicle 10, the method 700 proceeds via block 706 to block 710 and the driver gearshift request 12 is ignored.

However, if it is determined at block 704 that the driver of the vehicle 10 is pressing a brake 16 of the vehicle 10 the method 700 proceeds via block 708 to block 712.

At block 712, the driver gearshift request 12 is stored and the method proceeds to block 714. At block 714 it is determined if a timer has elapsed since the receipt of the driver gearshift request 12.

If it is determined that the timer has elapsed the method 700 proceeds via block 718 to block 710 and the driver gearshift request 12 is ignored. However, if it is determined at block 714 that the timer has not elapsed the method 700 proceeds via block 716 to block 720.

At block 720 it is determined if drive is available and/or available to engage. If it is determined, at block 720, that drive is not available and/or available to engage, the method 700 proceeds, via block 722, back to block 712. However, if it is determined, at block 720, that drive is available and/or available to engage the method 700 proceeds via block 724 to block 726 and drive is engaged.

Figure 8:
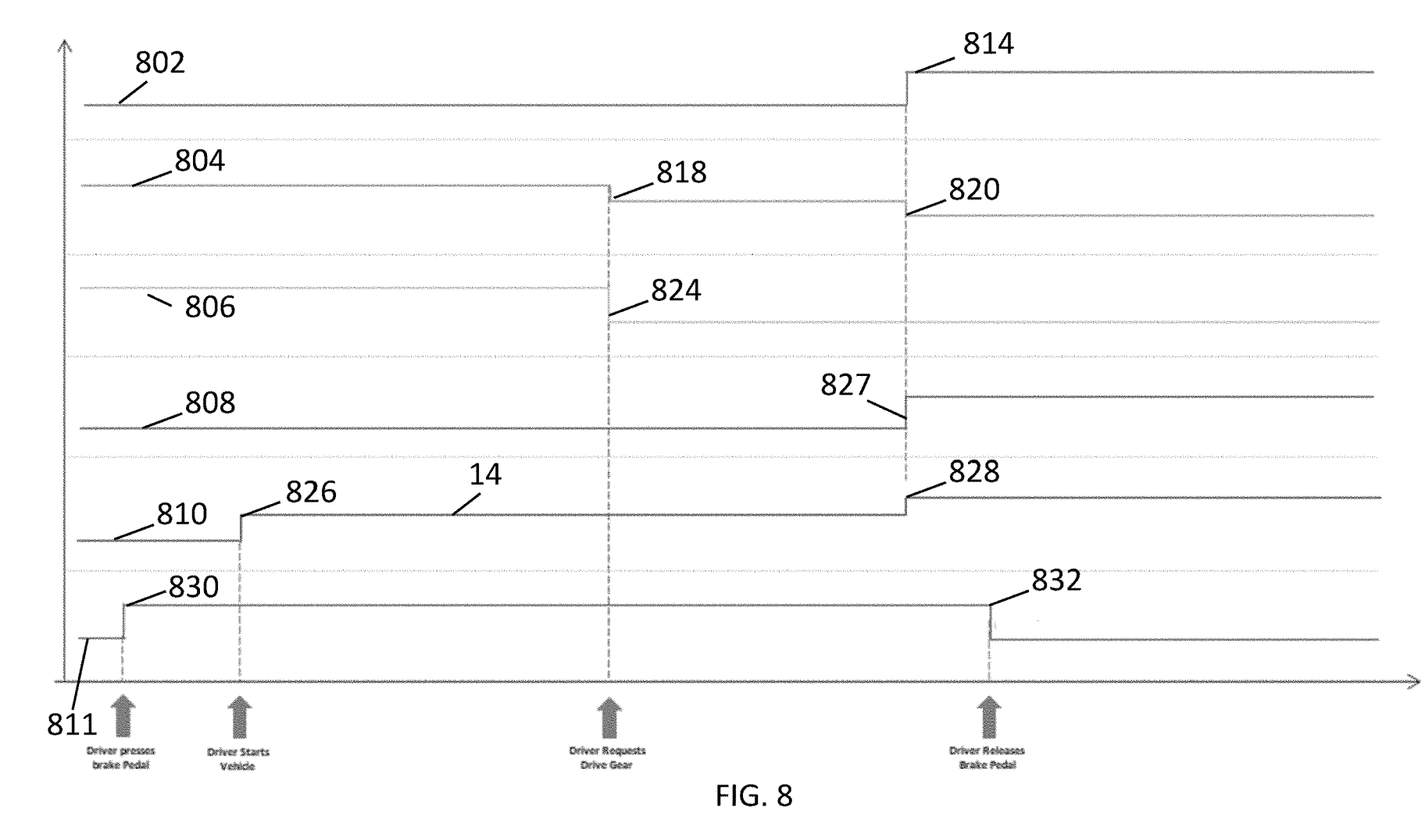
FIG. 8 illustrates example behaviour of a system.

FIG. 8 illustrates an example of behaviour of a system. The example of FIG. 8 illustrates an example of a system when performing one or more of the methods described herein.

In FIG. 8 a plurality of lines are illustrated showing the status of different aspects.

Moving from the top of FIG. 8 downwards, the upper line, indicated as 802, shows "gear position". The line below that, indicated as 804', shows "arbitrated driver gear request". The line below that, indicated as '806' shows "driver gear request". The line below that, indicated as 808, shows "gear availability". The line below that, indicated as 810, shows "vehicle initialisation" and the line below that, indicated as 811' shows "brake pedal status".

The axis at the bottom of FIG. 8 shows time increasing to the right.

As indicated by the left-most arrow indicated on the time axis, at a first time the driver presses the brake pedal resulting in a change in the brake pedal status 811 as indicated at 830.

At some time later, as indicated by the next arrow, the driver starts the vehicle 10. This is indicated by a change in the vehicle initialisation status 810 from "shut down" to "initialising" at 826. The vehicle 10 enters the initialisation period 14.

Subsequently, as illustrated by the next arrow, the driver requests drive gear. This results in a change in the driver gear request status 806, indicated by 824, and arbitrated driver gear request status 804, indicated by 818. According to the illustrated example, the driver request 12 is stored as the vehicle 10 is not yet initialised as indicated by the vehicle initialisation line 810 still indicating a status of "initialising".

At a later time, the vehicle initialisation status 810 changes from "initialising" to "running" as indicated by 828 and the gear availability 808 changes from "park available only" to "all gears available" as indicated at 827.

Accordingly, the drive request is accepted, as indicated at 820, and the drive gear engaged as indicated by 814 on the gear position line 802.

At a later time, the driver releases the brake pedal as indicated by 832 on the brake pedal status line 811.

Accordingly, the driver gearshift request 12 that was received during the initialisation period 14 is acted upon without further input from the driver.

Figure 9:
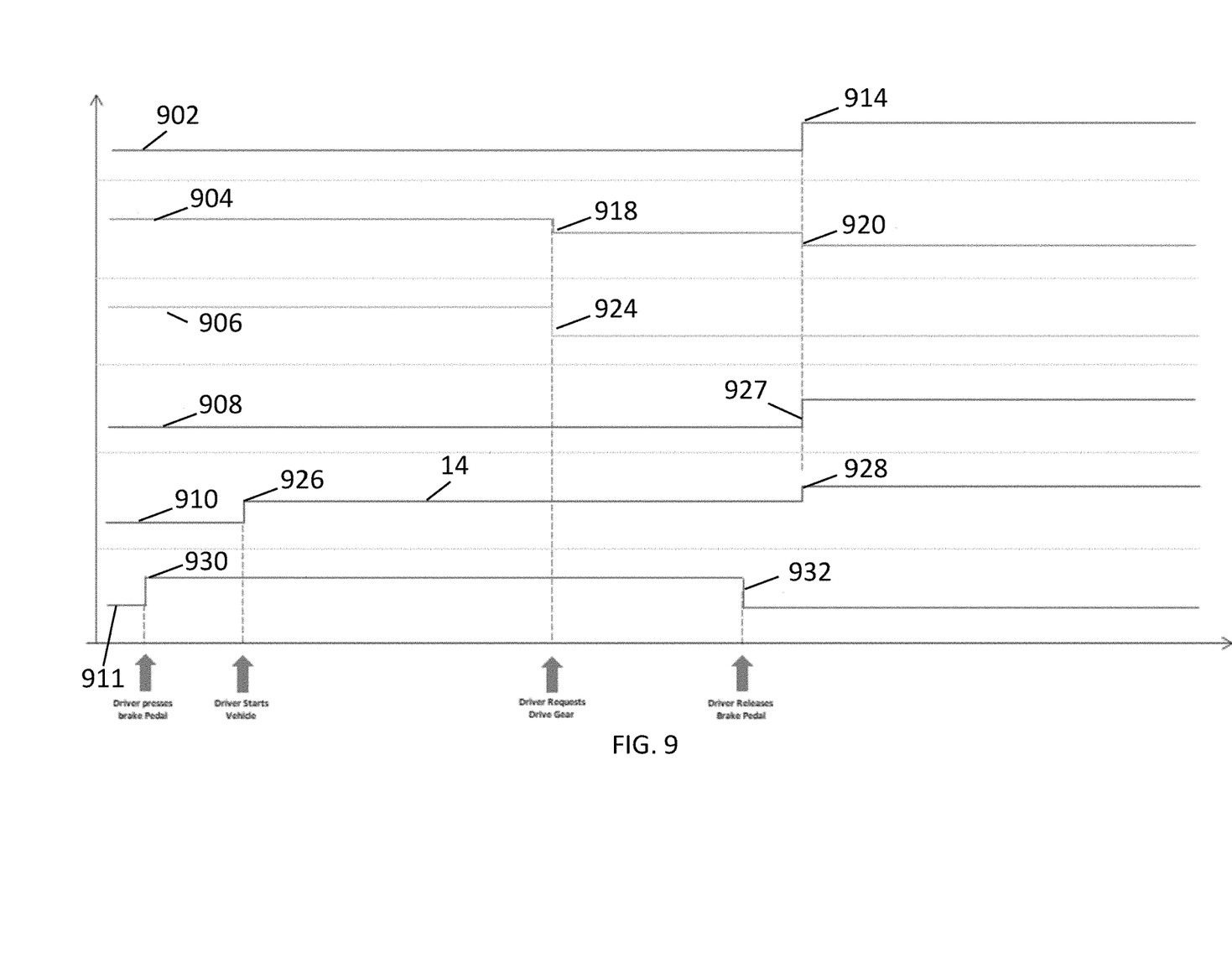
FIG. 9 illustrates example behaviour of a system.

FIG. 9 illustrates an example of performance of a system. The example of FIG. 9 illustrates an example of a system when performing one or more of the methods described herein.

FIG. 9 is similar to the example shown in FIG. 8 and corresponding reference numerals are used. However, the reference numerals start with '9' in FIG. 9 and '8' in FIG. 8.

In the example of FIG. 9, the driver releases the brake pedal prior to the end of the initialisation period 14 as can be seen by the brake pedal status 911 indicating "brake released" at 932 prior to the vehicle initialisation 910 indicating "running" at 928, and the drive gear being engaged at 914.

Figure 10:
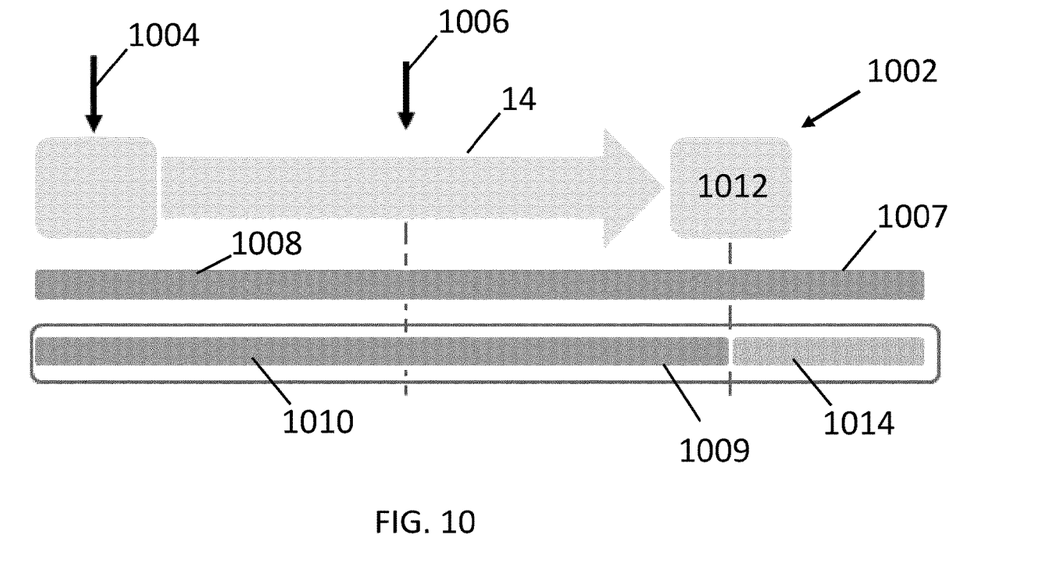
FIG. 10 illustrates example behaviour of a system.

FIG. 10 illustrates an example scenario.

In the example of FIG. 10, the upper line 1002 indicates the status of the availability of gears.

Initially, when the start button is pressed at 1004, only park is available. However, as illustrated, after the start button is pressed the vehicle 10 goes through vehicle initialisation to make park, reverse, neutral and drive available at 1012.

During the vehicle initialisation period 14 drive is requested at 1006.

The middle line of FIG. 10, indicated as 1007, shows that without the inventive examples described herein the request for drive gear would be ignored and park would remain engaged, as indicated by 1008, even when other gears are available at 1012.

The lower line 1009 indicates the behaviour according to the inventive examples described herein. As the requested drive gear is stored when the vehicle is in park, as indicated by 1010, and where further gears are made available, at 1012, drive is engaged at 1014, as expected by the driver.

Accordingly, as illustrated in the example of FIG. 10, the inventive examples disclosed herein prevent driver input from being ignored and, for example, allow a vehicle to respond as expected by a driver.

As used herein "for" should be considered to also include "configured or arranged to". For example, "a control system for" should be considered to also include "a control system configured or arranged to".

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

As used here 'module' refers to a unit or apparatus that excludes certain parts/components that would be added by an end manufacturer or a user.

The blocks illustrated in FIGS. 3, 4, 5, 6, and 7 may represent steps in a method and/or sections of code in the computer program (206). The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle, the control system comprising one or more controllers, wherein the control system is configured to:
   receive a driver gear shift request;
   determine if the vehicle is in a vehicle initialisation period;
   determine if a driver of the vehicle is actuating at least one brake of the vehicle;
   store the driver gear shift request based at least in part on a determination that the vehicle is in the vehicle initialisation period and the driver is actuating the at least one brake of the vehicle;
   determine if the vehicle initialisation period has ended; and
   control execution of the stored driver gear shift request when the vehicle initialisation period has ended.

2. The control system of claim 1, wherein the vehicle initialisation period is a period in which non-park gears are unavailable.

3. The control system of claim 1, wherein the vehicle initialisation period comprises an engine crank period, a transmission hydraulic pressure build-up period, and/or a period in which one or more safety and/or integrity checks are performed.

4. The control system of claim 1, wherein determining if the vehicle initialisation period has ended comprises determining if a gear requested in the driver gear shift request is available.

5. The control system of claim 1, wherein the control system is further configured to:
   determine if the vehicle initialisation period ends within a predetermined time from receiving the driver gear shift request; and
   control execution of the stored driver gear shift request if it is determined that the vehicle initialisation period has ended within the predetermined time from receiving the driver gear shift request.

6. The control system of claim 1, wherein the control system is further configured to:
   control execution of the stored driver gear shift request if it is determined that the vehicle initialisation period has ended and the driver of the vehicle is actuating the at least one brake of the vehicle.

7. The control system of claim 1, wherein the driver gear shift request is a request for a non-park gear.

8. A vehicle comprising the control system as claimed in claim 1.

9. A vehicle initialisation method, comprising:
   receiving a driver gear shift request;
   determining if a vehicle is in a vehicle initialisation period;
   determining if a driver of the vehicle is actuating at least one brake of the vehicle;
   storing the driver gear shift request based at least in part on a determination that the vehicle is in the vehicle initialisation period and the driver is actuating the at least one brake of the vehicle;
   determining if the vehicle initialisation period has ended; and
   controlling execution of the stored driver gear shift request when the vehicle initialisation period has ended.

10. The vehicle initialisation method of claim 9, wherein the vehicle initialisation period is a period in which non-park gears are unavailable.

11. The vehicle initialisation method of claim 9, wherein the vehicle initialisation period comprises an engine crank period, a transmission hydraulic pressure build-up period, and/or a period in which one or more safety and/or integrity checks are performed.

12. The vehicle initialisation method of claim 9, wherein determining if the vehicle initialisation period has ended comprises determining if a gear requested in the driver gear shift request is available.

13. The vehicle initialisation method of claim 9, further comprising:
- determining if the vehicle initialisation period ends within a predetermined time from receiving the driver gear shift request; and
- controlling execution of the stored driver gear shift request if it is determined that the vehicle initialisation period has ended within the predetermined time from receiving the driver gear shift request.

14. The vehicle initialisation method of claim 9, further comprising:
- controlling execution of the stored driver gear shift request if it is determined that the vehicle initialisation period has ended and the driver of the vehicle is actuating the at least one brake of the vehicle.

15. The vehicle initialisation method of claim 9, wherein the driver gear shift request is a request for a non-park gear.

16. Computer software that, when executed, is arranged to perform the vehicle initialisation method according to claim 9.

* * * * *